(12) United States Patent
Gudur et al.

(10) Patent No.: US 10,534,782 B1
(45) Date of Patent: Jan. 14, 2020

(54) SYSTEMS AND METHODS FOR NAME MATCHING

(71) Applicant: AMERICAN EXPRESS TRAVEL RELATED SERVICES COMPANY, INC., New York, NY (US)

(72) Inventors: Madhu Sudhan Reddy Gudur, Phoenix, AZ (US); Vinod Yadav, Phoenix, AZ (US); Ajay Kumar Punia, Phoenix, AZ (US); Sandeep Bose, Phoenix, AZ (US); Anand Bhushan, New York, NY (US); Hui-Ping W. Chao, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 86 days.

(21) Appl. No.: 15/232,584

(22) Filed: Aug. 9, 2016

(51) Int. Cl.
*G06F 16/2457* (2019.01)
*G06F 17/27* (2006.01)

(52) U.S. Cl.
CPC ...... *G06F 16/24578* (2019.01); *G06F 17/277* (2013.01); *G06F 17/278* (2013.01)

(58) Field of Classification Search
CPC ... G06F 17/30303; G06F 17/278; G06F 17/27
See application file for complete search history.

(56) References Cited

U.S. PATENT DOCUMENTS

| | | | |
|---|---|---|---|
| 5,895,461 A | 4/1999 | De La Huerga | |
| 6,820,135 B1 * | 11/2004 | Dingman | G06F 16/258 709/246 |
| 7,287,002 B1 * | 10/2007 | Asher | G06Q 10/08 705/26.8 |
| 7,305,404 B2 | 12/2007 | Owens | |
| 7,818,231 B2 * | 10/2010 | Rajan | G06Q 10/0635 705/35 |
| 8,078,524 B2 | 12/2011 | Crawford | |
| 2004/0024760 A1 * | 2/2004 | Toner | G06F 17/2715 |
| 2004/0220918 A1 | 11/2004 | Scriffignano et al. | |
| 2007/0174214 A1 | 7/2007 | Welsh | |
| 2008/0243832 A1 * | 10/2008 | Adams | G06F 17/2223 |
| 2009/0055206 A1 | 2/2009 | Orbke | |

(Continued)

OTHER PUBLICATIONS

Non-Final Office Action dated Mar. 4, 2019 in U.S. Appl. No. 15/399,401.

(Continued)

*Primary Examiner* — Charles E Lu

(74) *Attorney, Agent, or Firm* — Thomas Horstemeyer, LLP

(57) ABSTRACT

A system and method may allow for improved accuracy for name matching. The system may receive a name input and preprocess the name input. The name input may be tokenized to create a name token. The name token may be compared to a stored name. The system may calculate a first name matching score based on the comparison. The system may permute the name token to form a second level permutation name, compare the second level permutation name with the stored name, and calculate a second name matching score based on the comparison. The first name matching score may be compared with the second name matching score to improve accuracy in name matching.

20 Claims, 3 Drawing Sheets

(56) References Cited

U.S. PATENT DOCUMENTS

| | | |
|---|---|---|
| 2009/0119268 A1 | 5/2009 | Bandaru |
| 2009/0157733 A1 | 6/2009 | Kim |
| 2010/0153396 A1* | 6/2010 | Margulies ............. G06F 17/278 707/737 |
| 2012/0047179 A1 | 2/2012 | Faruquie |
| 2012/0089614 A1* | 4/2012 | Hamilton .......... G06F 17/30303 707/748 |
| 2014/0156263 A1* | 6/2014 | Patman Maguire .......................... G06F 17/2785 704/9 |
| 2015/0161519 A1* | 6/2015 | Zhong .................. G06F 17/278 706/12 |

OTHER PUBLICATIONS

Final Office Action dated Jul. 22, 2019 in U.S. Appl. No. 15/399,401
Advisory Action dated Sep. 30, 2019 in U.S. Appl. No. 15/399,401.

* cited by examiner

SYSTEMS AND METHODS FOR NAME MATCHING

FIELD

The disclosure generally relates to matching algorithms, and more specifically, to systems and methods for name matching.

BACKGROUND

Name matching algorithms may be used in various computer-based applications. For example, a user may input a personal name or business name into a search, and a computer application may attempt to match the name input with a stored name in a database. Name matching algorithms may also be used in financial and fraud detection contexts, where legal and regulatory burdens increase the need for highly accurate matches.

Typical name matching algorithms may be susceptible to variations in spelling, transcription errors, and common abbreviations. For example, typical name matching algorithms may be susceptible to extra white spaces, incorrect letter casing (e.g., "FiRsT last"), special characters (e.g., "Jean-Claude" or "O'Neil"), phonetic spelling (e.g., "Steven" compared with "Stephen"), misplaced letters and parts (e.g., "First MI Last" compared to "MI First Last" or "FirstMl Last"), middle name variances (e.g., "First Middle Last" compared to "First M. Last" or "First Last"), abbreviations (e.g., "First Middle Last" compared to "FML", "Jefferson Heavy Duty Shop" compared to "Jefferson Hvy Dty Shop", and/or "Robert" compared to "Rob" or "Bob"), prefixes and suffixes (e.g., "Mr.", "Honorable", "Ph.D", "Junior"), business keywords (e.g., "LLC", "Corporation", "Corp."), and/or various other typographical issues. Susceptibilities in typical name-matching algorithms may cause false positives and false negatives in search results.

SUMMARY

In various embodiments, systems, methods, and articles of manufacture (collectively, the "system") for name matching are disclosed. The system may receive a name input, may preprocess the name input and may tokenize the name input to create a name token. The system may receive a stored name from a data source and compare the name token to the stored name. The system may calculate a first name matching score based on the comparison of the name token to the stored name and a scoring factor.

In various embodiments, the system may permute the name token to create a second level permutation name. In various embodiments, the system may compare the second level permutation name to the stored name. In various embodiments, the system may calculate a second name matching score based on the comparison of the second level permutation name to the stored name.

In various embodiments, the system may compare the first name matching score to the second name matching score. The system may permute the name token to create a third level permutation name, in response to the second name matching score being greater than the first name matching score. The third level permutation name may be different from the second level permutation name. The scoring factor may comprise at least one of a comparison similarity, a token length, a scoring penalty, or a scoring penalty weight.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In various embodiments, the system may provide an improved level of accuracy for name matching. The system may improve accuracy of name matching for user names, business names, addresses, and/or the like. In financial or legal contexts, the improved accuracy for name matching may also enable the system to reduce risk and/or loss associated with fraud, security breaches, regulatory rules and/or regulatory guidelines. Benefits of the present disclosure may apply to any suitable and/or desired name matching use (virtual or otherwise).

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Figure 1:
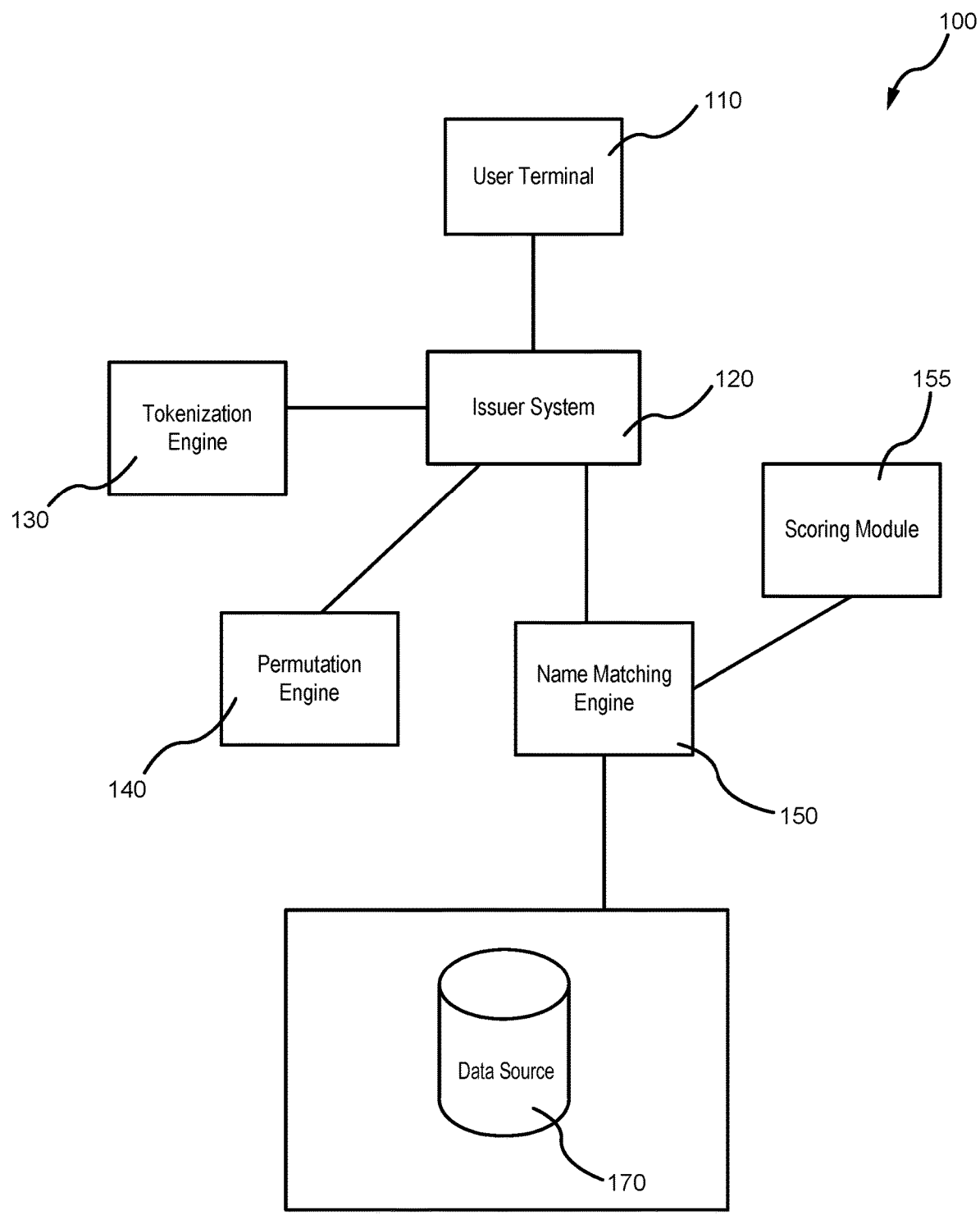
FIG. 1 is a block diagram illustrating various system components of a system for name matching, in accordance with various embodiments.

In various embodiments, and with reference to FIG. 1, a system 100 may comprise a user terminal 110, an issuer system 120, a tokenization engine 130, a permutation engine 140, a name matching engine 150, a scoring module 155, and a data source 170. System 100 may be computer based, and may comprise a processor, a tangible non-transitory computer-readable memory, and/or a network interface, along with other suitable system software and hardware components. Instructions stored on the tangible non-transitory memory may allow system 100 to perform various functions, as described herein.

In various embodiments, user terminal 110 may comprise hardware and/or software capable of allowing a user access to system 100. For example, user terminal 110 may comprise any suitable device allowing a user to communicate with a network, such as a personal computer, personal digital assistant, cellular phone, kiosk, and/or the like. User terminal 110 may allow the user to communicate with issuer system 120 to input a name input, and/or any other suitable input, for system 100 to match to a stored name. User terminal 110 may be in electronic and/or operative communication with issuer system 120.

In various embodiments, issuer system 120 may be configured as a central hub to access various systems, engines, and components of system 100. Issuer system 120 may comprise a network, computer-based system, and/or software component configured to provide an access point to various systems, engines, and components. Issuer system 120 may be in operative and/or electronic communication with user terminal 110, tokenization engine 130, permutation engine 140, and/or name matching engine 150. In this regard, issuer system 120 may allow communication from user terminal 110 to systems, engines, and components of system 100.

In various embodiments, tokenization engine 130 may be configured to tokenize the name input. Tokenization engine 130 may be in operative and/or electronic communication with issuer system 120. Tokenization engine 130 may receive the name input from user terminal 110, via issuer system 120, and tokenize the name input to create a name token. Tokenization engine 130 may also be configured to transmit the name token. For example, tokenization engine 130 may transmit the name token to permutation engine 140, via issuer system 120. Tokenization engine 130 may comprise and incorporate hardware and/or software components configured to tokenize the name input and transmit the name token.

In various embodiments, permutation engine 140 may be configured to receive the name token from tokenization engine 130, via issuer system 120. Permutation engine 140 may be configured to permute the name token into a second level permutation name. Permutation engine 140 may also be configured to permute the name token into a third level permutation name. Permutation engine 140 may comprise any suitable network, computer-based system, and/or software component. Permutation engine 140 may be in operative and/or electronic communication with issuer system 120.

In various embodiments, name matching engine 150 may be configured to compare the name token, the second level permutation name, the third level permutation name, and/or any higher level permutation name with a stored name. Name matching engine 150 may be in operative and/or electronic communication with issuer system 120 and/or data source 170. In that regard, name matching engine 150 may receive the name token, the second level permutation name, the third level permutation name, and/or any higher level permutation name from permutation engine 140, via issuer system 120. Name matching engine 150 may communicate with data source 170 to compare the name token, the second level permutation name, the third level permutation name, and/or any higher level permutation name to the stored name.

In various embodiments, system 100 may further comprise a scoring module 155. Scoring module 155 may comprise a module of name matching engine 150, and/or a separate engine and/or module within system 100. Scoring module 155 may be configured to ingest the comparison of the name token to the stored name and compute a first name matching score. Scoring module 155 may also be configured to ingest the comparison of the second level permutation name to the stored name and compute a second name matching score. Scoring module 155 may comprise any suitable network, computer-based system, and/or software component.

In various embodiments, data source 170 may incorporate various hardware and/or software components. Data source 170 may be in operative and/or electronic communication with name matching engine 150. In that regard, data source 170 may comprise any suitable resource containing data comprising at least a stored name. For example, data source 170 may comprise a database, such as an accounts receivable database, subscriber database, employee database, and/or the like, comprising data including the stored name. In various embodiments, data source 170 may also comprise a networked resource, such as a third-party financial system, the internet, and/or the like, comprising at least the stored name.

Figure 2:
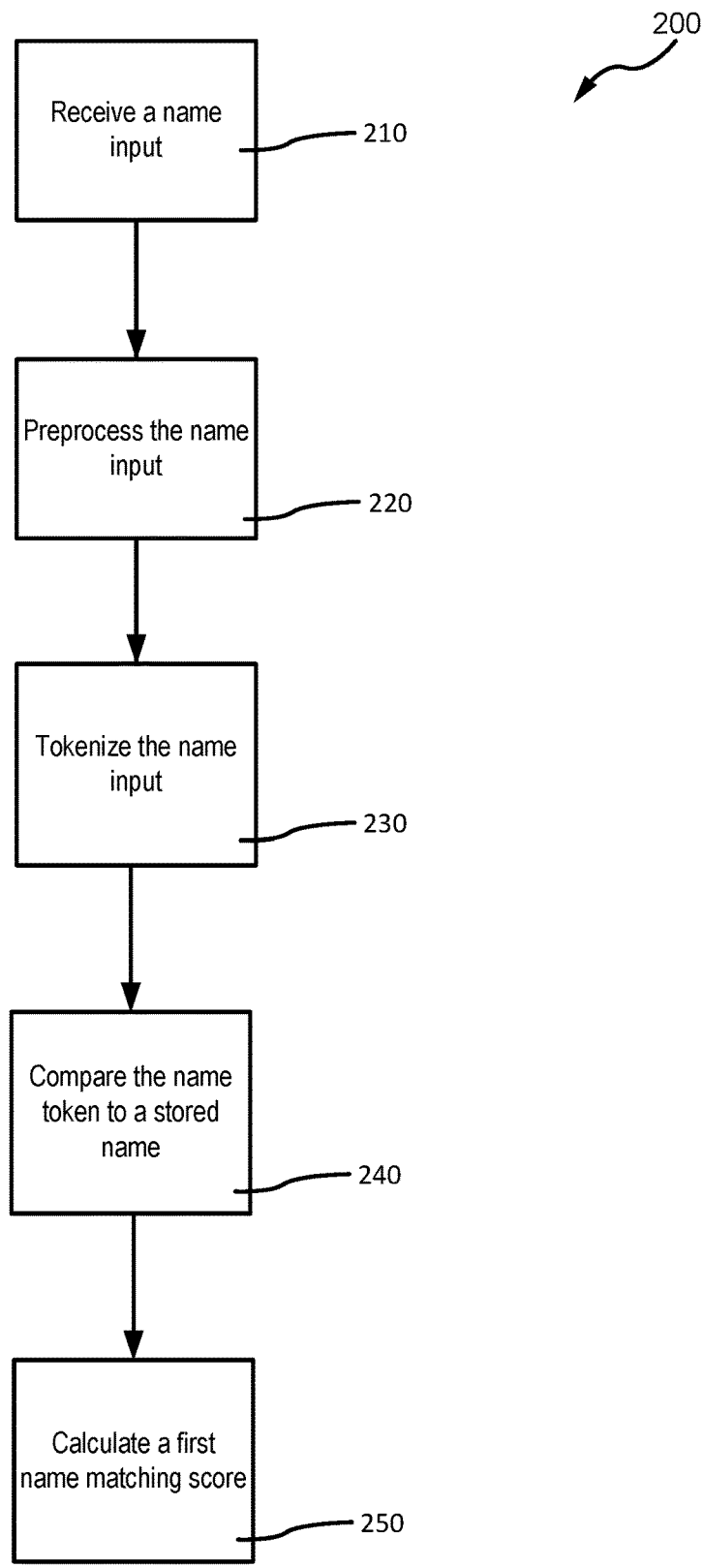
FIG. 2 illustrates a process flow for name matching, in accordance with various embodiments.

In various embodiments, and with reference to FIG. 2, a method 200 of name matching is disclosed. Method 200 may provide a process for name matching that is less susceptible to variations in spelling, transcription errors, and common abbreviations. For example, method 200 may allow for name matching that accounts for character insertions, deletions, and/or substitutions (e.g., "Firt Names" compared with "First Name"); character transpositions (e.g., "Lsat Naem" compared with "Last Name"); punctuation (e.g., "Last-Name" compared with "Last Name"); qualifiers (e.g., "First Middle Last" compared to "First Last"); merging permutations (e.g., "MiddleFirst Last" compared to "First Middle Last"); abbreviations and acronyms (e.g., "First Middle Last" compared to "FML"); phonetic similarities (e.g., "Stephen" and "Steven"); short forms (e.g., "James" compared to "Jim"); prefixes and suffixes (e.g., "Mr.", "Prof", "M.D.", "Jr."); character similarities (e.g., in a scanned document, and/or the like, a "c" may appear as an "o"); keyboard distance metrics (e.g., in the input "Firat Name", the character "a" is close to the character "s" on a standard keyboard); and/or the like. Method 200 may also allow for name matching without requiring the use of a look up table in a database.

In various embodiments, method 200 may comprise receiving a name input (Step 210). Issuer system 120 may receive the name input from user terminal 110. The name input may comprise any data input by a user, and/or transmitted by user terminal 110. For example, the user may input the name input to search for a name in a search engine, to enter data into an online form, and/or the like. User terminal 110 may also transmit the name input to issuer system 120 based on an automated computer-application event, such as with a bank transaction, merchant fraud verification, and/or the like. In that regard, and for example, the name input may comprise "FirstName LastName", "First MI Last", "FirstMLast", and/or any other desired phrase or name inquiry. The name input may also comprise a business name, such as, for example, "Business Name", "Business Name, Incorporated", "Business Name, LLC", and/or any other desired input.

In various embodiments, method 200 may comprise preprocessing the name input (Step 220). Tokenization engine 130 may receive the name input from issuer system 120, and preprocess the name input. In that regard, Step 220 may comprise preprocessing the name input by removing leading and trailing white spaces. For example, in response to the name input comprising "First Last", Step 220 may comprise removing the leading and trailing white spaces to form "First Last". In various embodiments, Step 220 may also comprise removing case sensitivity in the name input. Tokenization engine 130 may remove case sensitivity by converting every character in the name input to an uppercase or lowercase letter. For example, Step 220 may comprise removing case sensitivity of the name input "fIrsT LasT" by converting the name input to "FIRST LAST" or "first last".

In various embodiments, method 200 may comprise tokenizing the name input to create a name token (Step 230). Tokenization engine 130 may parse the name input and create the name token. For example, a name token may include a data packet of at least a subset of the name input. In that regard, tokenization engine 130 may tokenize the name input by creating a separate name token for each string of the name input separated by a space and/or a non-alphanumeric character. Tokenization engine 130 may create the number of name tokens as needed, based on the name input. For example, in response to the name input comprising "first-name last", tokenization engine 130 may create a first name token of "first", a second name token of "name", and a third name token of "last". In response to the name input comprising "first-name m. last", tokenization engine 130 may create a first name token of "first", a second name token of "name", a third name token of "m", and a fourth name token of "last". In various embodiments, tokenization engine 130 may also tokenize the name input into a single name token, or any suitable number of name tokens, such as a name token of "first middle last".

In various embodiments, method 200 may also comprise analyzing the name token to account for abbreviations, acronyms, short forms, and/or the like, such as, for example, by comparing the name token to a short form list. Tokenization engine 130 may compare the name token to the short form list. The short form list may be a document, file, database, and/or any other suitable list comprising short form names. The short form list may be located in tokenization engine 130, and/or may comprise a separate module, database, system, and/or the like, in electronic and/or operative communication with tokenization engine 130. The short form list may comprise a list of short form names with the corresponding full name. For example, common short forms may include "Liz" or "Betty" for the full name "Elizabeth"; "Jim" for the full name "James"; "Rob" or "Bob" for the full name "Robert"; or "Rick" or "Dick" for the full name "Richard", to cite a few examples. Tokenization engine 130 may compare the name token to the short form names in the short form list. In response to the name token matching a short form name, tokenization engine 130 may replace the name token with the full name. For example, in response to a name token comprising "Jim", tokenization engine 130 may compare "Jim" to the short form names in the short form list, and replace "Jim" with the full name "James."

In various embodiments, method 200 may comprise comparing the name token to a stored name (Step 240). Tokenization engine 130 may transmit the name token to name matching engine 150, via issuer system 120. Name matching engine 150 may communicate with data source 170 to compare the name token to the stored name. In that regard, name matching engine 150 may communicate with data source 170 to determine the stored name that is the most similar to the name token. Name matching engine 150 may compare the name token to the stored name by comparing each string of the name token with each string of the stored name. For example, in response to the name token comprising "firstname last", and the stored name comprising "firstname middle last", name matching engine 150 may compare "firstname" to "firstname", "middle", and "lastname", and "last" to "firstname", "middle", and "last". By comparing each token, name matching engine 150 may match "firstname" to "firstname" and "last" to "last" as the most similar strings.

In various embodiments, method 200 may comprise calculating a first name matching score (Step 250). The name matching score may comprise an estimate of the similarity between the name input, and/or a name permutation, and the stored name. For example, the name matching score may comprise a range of 0 to 1, wherein 0 represents no similarity in the comparison, 0.5 represents a partial similarity in the comparison, and 1 represents a complete match in the comparison. The name matching score may comprise any other suitable numerical range, such as 0 to 10, 0 to 100, and/or the like. The name matching score may also comprise an alphabetical grading range, such as, for example an "A" representing a complete match in the comparison, a "C" representing a partial similarity in the comparison, and an "F" representing no similarity in the comparison.

In various embodiments, scoring module 155 may communicate with name matching engine 150 to ingest the comparison of the name token with the stored name, and calculate the first name matching score. Scoring module 155 may calculate the first name matching score based on a scoring factor. For example, the scoring factor may be based on the ingested comparison of the name token with the stored name. In that regard, the name matching score may be calculated based on the similarity of the compared strings. The scoring factor may also be based on string length. For example, a higher name matching score may be calculated for similarity in comparing a string having a longer length (e.g., a first name or last name typically has a longer length than a middle initial), compared to a string having a shorter length.

In various embodiments, the scoring factor may also comprise a scoring penalty configured to lower the name matching score. For example, the scoring penalty may be assessed for each missing string (e.g., "first name" compared to "first middle name" is missing the token "middle"). Moreover, the scoring penalty may also be weighted based on the location of the missing string. For example, higher priority may be given to correct matches of first and last names, and a lower priority to middle names, such that the scoring penalty for a missing string at the start or end of the name token may be given a greater weight compared to a missing string in the middle of the name token. The scoring penalty may also be weighted differently based on whether the missing string is a business identifier. For example, lower weight may be given to a missing or poorly matched business identifier (e.g., "LLC", "Corp."), and greater weight may be given to a match of the business name (e.g., "business name" matching "business name").

Figure 3:
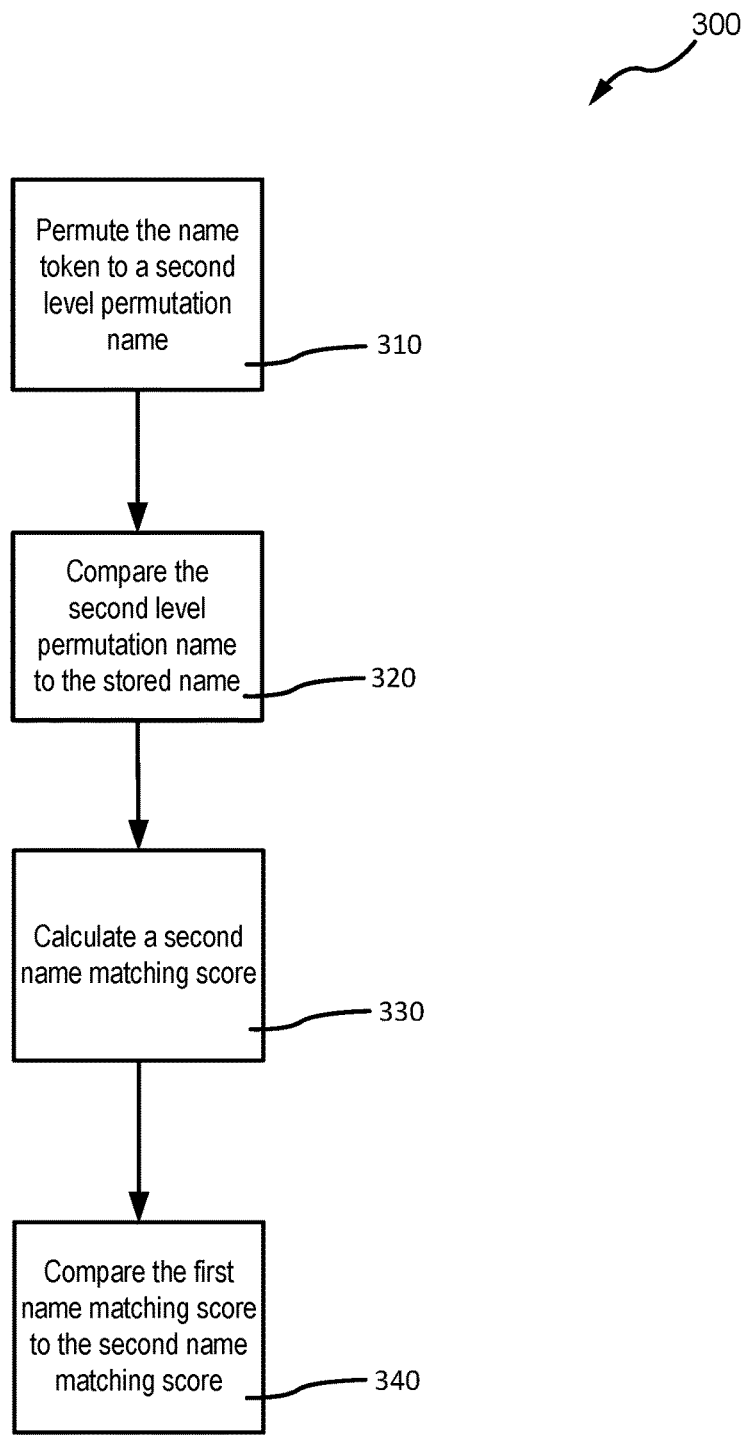
FIG. 3 illustrates a process flow for calculating a name matching score, in accordance with various embodiments.

In various embodiments, and with reference to FIG. 3, a method 300 for permuting the name token to improve accuracy in name matching is disclosed. In various embodiments, method 300 may improve accuracy in name matching in response to the first name matching score calculated in Step 250 not indicating a name match (e.g., where the name matching score comprises a numerical range of 0 to 1.0, the first name matching score calculated in Step 250 is not 1.0). In that regard, method 300 may permute the name token to further improve accuracy in name matching between the name input and the stored name.

In various embodiments, method 300 may comprise permuting the name token to a second level permutation name (Step 310). Permutation engine 140 may receive the name token from tokenization engine 130, via issuer system 120. Step 310 may comprise combining, merging, and/or separating the name tokens to create different permutations of the name tokens. In that regard, Step 310 may increase accuracy in name matching by permuting the name tokens to locate a grouping of words having the highest similarity to the stored name. In various embodiments, the second level permutation name may comprise a permutation of one of the name tokens permuted with the remaining name tokens (e.g., a first name token is individually combined with a second name token, a third name token, and a fourth name token). For example, in response to the name input comprising "first-name last" being tokenized during Step 230, with brief reference to FIG. 2, to create the first name token of "first", the second name token of "name", and the third name token of "last", permutation engine 140 may permute the name tokens to create the second level permutation name comprising "first-name last"; "namefirst last"; "firstlast name"; "lastfirst name"; "first namelast"; "first lastname"; and/or any other suitable permutation.

In various embodiments, method 300 may comprise comparing the second level permutation name to the stored name (Step 320). Permutation engine 140 may transmit the second level permutation name to name matching engine 150, via issuer system 120. Name matching engine 150 may communicate with data source 170 to compare the second level permutation name to the stored name. In that regard, Step 320 may comprise substantially the same steps and comparisons of Step 240 of method 200, with brief reference to FIG. 2.

In various embodiments, method 300 may comprise calculating a second name matching score (Step 330). Scoring module 155 may communicate with name matching engine 150 to ingest the comparison of Step 320, and calculate the second name matching score. In that regard, scoring module 155 may calculate the second name matching score using substantially the same steps and calculations of calculating the first name matching score during Step 250, with brief reference to FIG. 2.

In various embodiments, method 300 may comprise comparing the first name matching score to the second name matching score (Step 340). Scoring module 155 may compare the first name matching score to the second name matching score. In response to the second name matching score being greater than the first name matching score, scoring module 155 may instruct permutation engine 140, via issuer system 120, to create a third level permutation name. Permutation engine 140 may permute the name token using substantially the same steps and permutations comprised in Step 310. In that regard, the third level permutation name may be different from the second level permutation name. In various embodiments, the third level permutation name may comprise a permutation of two of the name tokens permuted with the remaining name tokens. For example, in response to the name input comprising "first-name last" being tokenized during Step 230, with brief reference to FIG. 2, to create the first name token of "first", the second name token of "name", and the third name token of "last", permutation engine 140 may permute the name tokens to create the third level permutation name comprising "first-namelast"; "firstlastname"; "lastnamefirst"; "namelastfirst"; "lastfirstname"; "namefirstlast"; and/or any other suitable permutation different from the second level permutation name. Scoring module 155 may ingest the comparison and calculate a second name matching score. In that regard, scoring module 155 may calculate the second name matching score using substantially the same steps and calculations of calculating the first name matching score during Step 250, with brief reference to FIG. 2, and calculating the second name matching score during Step 330. Scoring module 155 may compare the second name matching score to the second name matching score. In response to the second name matching score being greater than the second name matching score, Step 340 may be repeated, with permutation engine 140 permuting the name token to create a third name permutation.

In response to the first name matching score being greater than the second name matching score, scoring module 155 may communicate with user terminal 110, via issuer system 120, that a match of the name input has been found. In that regard, user terminal 110 may display a list of search results, ordered by name matching score, and/or the like, or may display only the matched stored name, and/or any corresponding data.

In various embodiments, Step 340 may also comprise generating a name matching history report. In that regard, the name matching history report may comprise an administrative report, technical report, and/or the like configured to present statistics on the system. For example, the name matching history report may comprise data on the frequency of the second name matching score being greater than the first name matching score, user and/or system reported false positives and/or false negatives, and/or any other suitable metric, statistic, and/or the like. Scoring module 155 may transmit the name matching history report to user terminal 110, via issuer system 120. Scoring module 155 may transmit the name matching history report via email, text message, and/or any other desired format.

In various embodiments, the system may include alerting a user when their computer (e.g., user terminal 110) is offline. The system may include generating customized information (e.g., the name matching history report) and alerting a remote user that the information can be accessed from their computer (e.g., user terminal 110). The alerts are generated by filtering received information, building information alerts and formatting the alerts into data blocks based upon user preference information. The data blocks are transmitted to the user's wireless device (e.g., user terminal 110) which, when connected to the computer, causes the computer to auto-launch an application to display the information alert and provide access to more detailed information about the information alert. More particularly, the system may comprise providing a viewer application to a user for installation on the remote user computer; receiving information at a transmission server (e.g., issuer system 120) sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote user computer and to enable connection via the URL to the data source over the Internet when the wireless device is locally connected to the remote user computer and the remote user computer comes online.

In various embodiments, the system may include a graphical user interface for dynamically relocating/rescaling obscured textual information (such as, for example, data from the name matching history report) of an underlying window to become automatically viewable to the user. By permitting textual information to be dynamically relocated based on an overlap condition, the computer's (e.g., user terminal 110) ability to display information is improved. More particularly, the system may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer (e.g., user terminal 110) from being compromised, for example by being infected with a computer virus, when a user requests or interacts with virtual tokens. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over users during name, using a system for co-marketing the "look and feel" of the host web page (e.g., a web page hosted by issuer system 120) with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer, via user terminal 110, for example, so that she effectively remains on the host web page to search for a name without being redirected to the third party merchant affiliate. Because such composite pages are visually perceived by the customer as associated with the host web page, they give the customer the impression that she is viewing pages served by the host. Further, the customer is able to search for a name without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Phrases and terms similar to an "party" may include any individual, consumer, customer, group, business, organization, government entity, transaction account issuer or processor (e.g., credit, charge, etc), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

A record of charge (or "ROC") may comprise any transaction or transaction data. The ROC may be a unique identifier associated with a transaction. A transaction may, in various embodiments, be performed by a one or more members using a transaction account, such as a transaction account associated with a gift card, a debit card, a credit card, and the like. A ROC may, in addition, contain details such as location, merchant name or identifier, transaction amount, transaction date, account number, account security pin or code, account expiry date, and the like for the transaction.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S.

Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944, 849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, information, metadata, etc), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the herein particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system may also include a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA® SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® OS, OS2, UNIX® OS, LINUX® OS, SOLARIS®, MacOS, and/or the like) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as microapplications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

As used herein, "transmit" may include sending electronic data from one system component to another over a network connection. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. The databases may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts.

Middleware may include any hardware and/or software suitably configured to facilitate communications and/or process transactions between disparate computing systems.

Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. Cryptography and network security methods are well known in the art, and are covered in many standard texts.

As used herein, the term "end user", "consumer", "customer", "cardmember", "business", "merchant", or "financial institution" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein.

The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is intended to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
   identifying, by a processor, each string in a name input separated by a space or a non-alphanumeric character;
   parsing, by the processor and based on the identifying, the name input into a first subset of the name input and a second subset of the name input;
   tokenizing, by the processor and based on the parsing, the name input to create a first name token and a second name token, wherein the first name token comprises the first subset of the name input and the second name token comprises the second subset of the name input;
   determining, by the processor, that at least one of the first name token or the second name token match a short form name from a database;
   replacing, by the processor, at least one of the first name token or the second name token with a full name associated with the short form name;
   determining, by the processor, a first stored name that has a first similarity to the first name token;
   determining, by the processor, a second stored name that has a second similarity to the second name token;
   calculating, by the processor, a first name matching score based on an estimate of the first similarity, a first string length of the first name token, a missing first string, and a location of the missing first string;
   calculating, by the processor, a second name matching score based on an estimate of the second similarity, a second string length of the second name token a missing second string, and a location of the missing second string;
   permuting, by the processor, the first name token and the second name token to create a second level permutation name, wherein the second level permutation name is created by combining the first name token with the second name token based on a permutation order, and wherein the permutation order comprises at least one of adding the first name token to a start of the second name token or an end of the second name token, or adding the second name token to a start of the first name token or an end of the first name token, and improving, by the processor and based on the permuting, an accuracy of a name match using the first name token and the second name token.

2. The method of claim 1, further comprising comparing, by the processor, the second level permutation name to at least one of the first stored name or the second stored name.

3. The method of claim 1, further comprising refining, by the processor, the calculating of the second name matching score based on the comparing the second level permutation name to at least one of the first stored name or the second stored name.

4. The method of claim 1, further comprising comparing, by the processor, the first name matching score to the second name matching score.

5. The method of claim 1, further comprising permuting, by the processor, the first name token and the second name token to create a third level permutation name, in response to the second name matching score being greater than the first name matching score, wherein the third level permutation name is different from the second level permutation name.

6. The method of claim 1, wherein the calculating is based on a scoring factor that comprises at least one of a scoring penalty, or a scoring penalty weight.

7. The method of claim 1, wherein the calculating the first name matching score is further based on at least one of a missing business identifier or a poorly matched business identifier.

8. The method of claim 1, wherein the name match is used in at least one of a search engine, a bank transaction, a merchant fraud verification, or a legal context.

9. The method of claim 1, further comprising preprocessing, by the processor, the name input by at least one of removing a leading white space, removing a trailing white space, converting each lowercase character to an uppercase character, or converting each uppercase character to a lowercase character.

10. A system comprising:
   a processor; and
   a tangible, non-transitory memory configured to communicate with the processor,
   the tangible, non-transitory memory having instructions stored thereon that, in response to execution by the processor, cause the processor to perform operations comprising:
   identifying, by the processor, each string in a name input separated by a space or a non-alphanumeric character;
   parsing, by the processor and based on the identifying, the name input into a first subset of the name input and a second subset of the name input;
   tokenizing, by the processor and based on the parsing, the name input to create a first name token and a second name token, wherein the first name token comprises the first subset of the name input and the second name token comprises the second subset of the name input;
   determining, by the processor, that at least one of the first name token or the second name token match a short form name from a database;
   replacing, by the processor, at least one of the first name token or the second name token with a full name associated with the short form name;
   determining, by the processor, a first stored name that has a first similarity to the first name token;
   determining, by the processor, a second stored name that has a second similarity to the second name token;
   calculating, by the processor, a first name matching score based on an estimate of the first similarity, a first string length of the first name token, a missing first string, and a location of the missing first string;
   calculating, by the processor, a second name matching score based on an estimate of the second similarity, a second string length of the second name token a missing second string, and a location of the missing second string;
   permuting, by the processor, the first name token and the second name token to create a second level permutation name, wherein the second level permutation name is created by combining the first name token with the second name token based on a permutation order, and wherein the permutation order comprises at least one of adding the first name token to a start of the second name token or an end of the second name token, or adding the second name token to a start of the first name token or an end of the first name token; and
   improving, by the processor and based on the permuting, an accuracy of a name match using the first name token and the second name token.

11. The system of claim 10, further comprising comparing, by the processor, the second level permutation name to at least one of the first stored name or the second stored name.

12. The system of claim 10, further comprising permuting, by the processor, the first name token and the second name token to create a third level permutation name, in response to the second name matching score being greater than the first name matching score, wherein the third level permutation name is different from the second level permutation name.

13. The system of claim 10, wherein the calculating is based on a scoring factor that comprises at least one of a scoring penalty, or a scoring penalty weight.

14. The system of claim 10, further comprising preprocessing, by the processor, the name input by at least one of removing a leading white space, removing a trailing white space, converting each lowercase character to an uppercase character, or converting each uppercase character to a lowercase character.

15. An article of manufacture including a non-transitory, tangible computer readable storage medium having instructions stored thereon that, in response to execution by a computer based system, cause the computer based system to perform operations comprising:
   identifying, by the computer based system, each string in a name input separated by a space or a non-alphanumeric character;
   parsing, by the computer based system and based on the identifying, the name input into a first subset of the name input and a second subset of the name input;
   tokenizing, by the computer based system and based on the parsing, the name input to create a first name token and a second name token, wherein the first name token comprises the first subset of the name input and the second name token comprises the second subset of the name input;
   determining, by the computer based system, that at least one of the first name token or the second name token match a short form name from a database;
   replacing, by the computer based system, at least one of the first name token or the second name token with a full name associated with the short form name;
   determining, by the computer based system, a first stored name that has a first similarity to the first name token;

determining, by the computer based system, a second stored name that has a second similarity to the second name token;

calculating, by the computer based system, a first name matching score based on an estimate of the first similarity, a first string length of the first name token, a missing first string, and a location of the missing first string;

calculating, by the computer based system, a second name matching score based on an estimate of the second similarity, a second string length of the second name token a missing second string, and a location of the missing second string;

permuting, by the computer based system, the first name token and the second name token to create a second level permutation name, wherein the second level permutation name is created by combining the first name token with the second name token based on a permutation order, and wherein the permutation order comprises at least one of adding the first name token to a start of the second name token or an end of the second name token, or adding the second name token to a start of the first name token or an end of the first name token; and improving, by the computer based system and based on the permuting, an accuracy of a name match using the first name token and the second name token.

16. The article of manufacture of claim 15, further comprising comparing, by the computer based system, the second level permutation name to at least one of the first stored name or the second stored name.

17. The article of manufacture of claim 15, further comprising refining, by the computer based system, the calculating of the second name matching score based on the comparing the second level permutation name to at least one of the first stored name or the second stored name.

18. The article of manufacture of claim 15, further comprising permuting, by the computer based system, the first name token and the second name token to create a third level permutation name, in response to the second name matching score being greater than the first name matching score, wherein the third level permutation name is different from the second level permutation name.

19. The article of manufacture of claim 15, wherein the calculating is based on a scoring factor that comprises at least one of a scoring penalty, or a scoring penalty weight.

20. The article of manufacture of claim 15, further comprising preprocessing, by the computer based system, the name input by at least one of removing a leading white space, removing a trailing white space, converting each lowercase character to an uppercase character, or converting each uppercase character to a lowercase character.

* * * * *